March 29, 1960

F. MUHLENBRUCH 2,930,475

CONVEYOR SYSTEM

Filed May 27, 1958

INVENTOR.
FRED MUHLENBRUCH.

BY Percy Freeman

ATTORNEY.

March 29, 1960 F. MUHLENBRUCH 2,930,475
CONVEYOR SYSTEM

Filed May 27, 1958 2 Sheets-Sheet 2

INVENTOR.
FRED MUHLENBRUCH
BY
ATTORNEY.

United States Patent Office 2,930,475
Patented Mar. 29, 1960

2,930,475
CONVEYOR SYSTEM
Fred Muhlenbruch, Flushing, N.Y.
Application May 27, 1958, Serial No. 738,087
6 Claims. (Cl. 198—32)

This invention relates to conveyors and, more particularly, to an automatically controlled special purpose conveyor system.

In the packing of certain types of products, such as dairy products, a separate conveyor is used to move individual articles from one station to a packing station. Ordinarily, a separate conveyor has been used for moving such articles between each set of stations. With intermittently operating equipment, however, there are many idle periods in which the operator handling an individual packing station has no work to perform. However, it is usually not possible for a single operator to handle two completely separate conveyor lines since it is not likely that one conveyor will be idle while he is busy packing the articles carried by the other such conveyor. On the other hand, it has been found that a single operator can handle the articles carried by two separate conveyors provided that they are supplied to him in a continuous stream rather than in two separate streams over which he would have little control.

Accordingly, it is an object of the present invention to provide a completely automatic conveyor system that will intermittently feed articles into a single main conveyor from two auxiliary conveyors that are intermittently supplied with such articles from separate sources, so as to overcome the aforementioned difficulties, even cut the work periods of the operator, and provide for greater operating efficiency under these conditions.

Another object of the present invention is to provide a conveyor system that includes an automatically operated gate which will temporarily block the flow of articles into a main conveyor from one auxiliary conveyor while another associated auxiliary conveyor is feeding articles into the main conveyor.

A further object of the present invention is to provide a conveyor system of the above type in which the gate is automatically movable to open the temporarily blocked auxiliary conveyor so as to feed the articles carried thereby into the main conveyor as soon as there is a momentary lapse in the flow of articles through the previously feeding auxiliary conveyor.

An additional object of the present invention is to provide a conveyor system of the type described in which the gate is automatically controlled by sensing devices associated with each of the auxiliary conveyors, in which the sensing devices are completely responsive to the presence and absence of articles on the respective auxiliary conveyors adjacent to the automatically operated gate.

All of the foregoing and still further objects and advantages of this invention will become apparent from a study of the following specification, taken in connection with the accompanying drawing, wherein.

Figure 2:
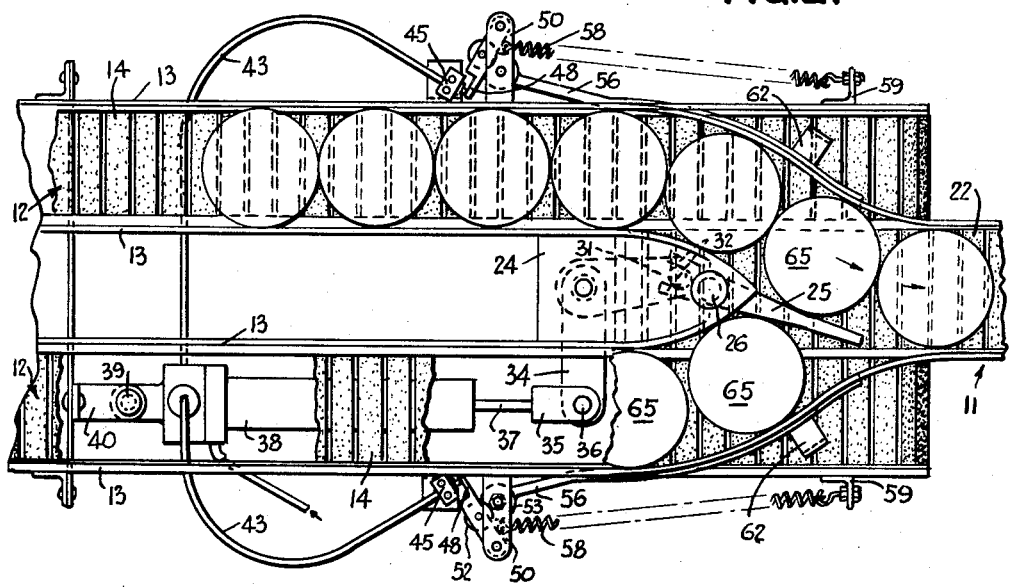
Fig. 2 is a top plan view of the apparatus shown in Fig. 1, with the control gate in one operating position.
Figure 1:
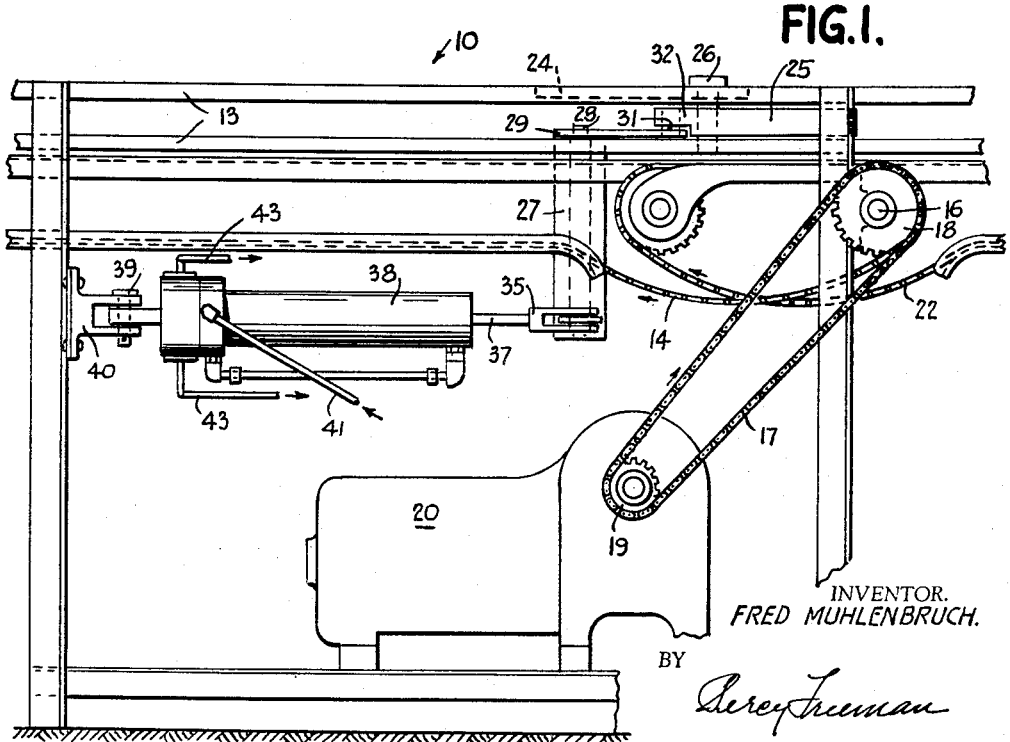
Fig. 1 is a fragmentary side elevational view of a conveyor system made in accordance with the present invention in operative use.

Referring now more in detail to the drawing, a completely automatic conveyor system 10 made in accordance with the present invention is shown to include a pair of auxiliary conveyor lines 12 which feed into a single main conveyor line 11. Each of the auxiliary conveyor lines include guide rails 13 and a flexible belt 14 that is trained about a drive shaft 16. The shaft 16 is rotated by means of a chain 17 that encircles a sprocket wheel 18 carried by the shaft 16 and a drive sprocket 19 carried upon the shaft of a motor 20. The flexible belt 22 of the main conveyor line is driven from the opposite end of the line in a similar manner, completely independently of the drive mechanism for the auxiliary conveyor line.

The auxiliary conveyor lines 12 are spaced apart by a medial mounting divider 24 which pivotally supports a gate member 25 adjacent to the terminal ends of the auxiliary conveyors 12 where they feed into the main conveyor line 11. This gate 25 is pivotally supported by means of a pivot pin 26 intermediate its ends. The inner end of the gate has a pair of bifurcated arm portions 32 which slidably receive a stud 31 therebetween that is carried upon a crank arm 29. This arm 29 is secured to the upper end of a pivot shaft 28 that is slidably received within an elongated vertical sleeve 27 carried upon the frame of the conveyor structure.

The lower end of the pivot shaft 28 has another crank arm 34 which is connected at its outer end to the yoke 35 of a piston 37 by means of a pin 36. The piston 37 is slidably supported within a double-acting cylinder 38 for reciprocating longitudinal movement between an extended and a retracted position to thus control the movement of the crank arms 29, 34 and the position of the gate 25. The cylinder 38 is pivotally mounted by means of a pin 39 upon a fixed bracket 40 secured to the conveyor frame so as to accommodate the slight pivotal movements thereof during the displacement of the piston.

The double-acting pneumatic cylinder 38 is of a conventional special purpose type in which air is supplied under pressure through a supply line 41 to the interior of the cylinder 38, to both sides of the piston slidably supported therewithin. A pair of connecting lines 43, each connected to a different side of the piston supported within the cylinder 38 are connected to separate pressure relief valves 45 which are supported adjacent to each one of the auxiliary conveyor lines 12. It will now be recognized that with pressure being supplied through supply line 41 to both sides of the piston with the cylinder 38 at all times, the opening of either one of the pressure relief valves 45 will permit the pressurized fluid on one side of the piston to be exhausted to atmopshere, thus enabling the pressure on the other side of the piston to effect longitudinal movement of the piston from one longitudinal extremity to the other. As soon as the respective pressure relief valve is closed, the balance of pressure on both sides of the piston is automatically restored, but without effecting the change in the position of the piston until the next unbalance occurs. These pressure relief valves 45 are thus used to control the position of the gate 25, as will be hereinafter more fully described.

Figure 3:
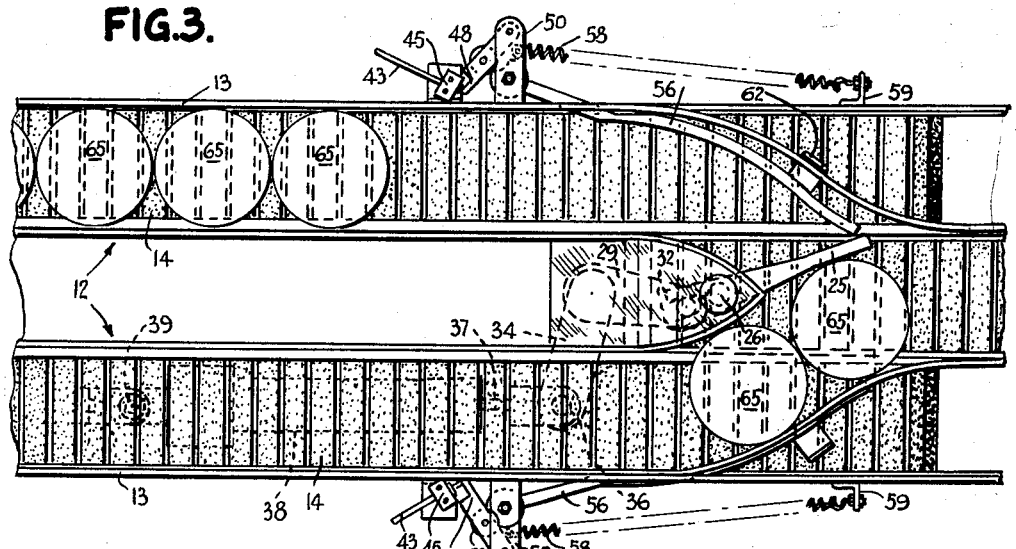
Fig. 3 is a view similar to Fig. 2, showing the control gate in an alternating operating position.
Figures 4, 5:
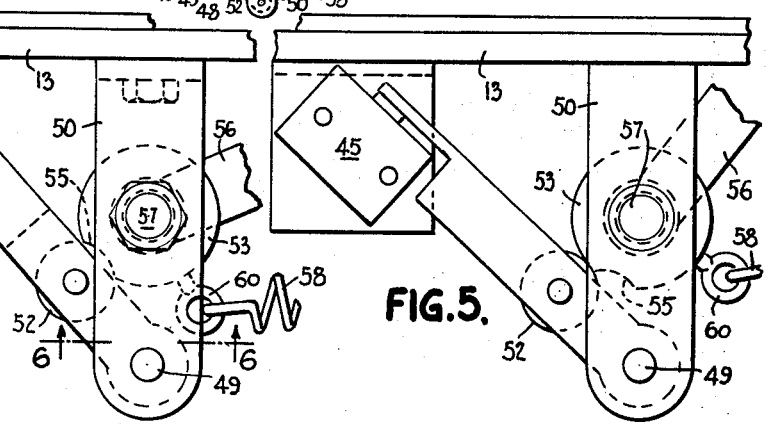
Fig. 4 is an enlarged fragmentary top plan view of a sensing device forming a part of the present invention in an actuated position.
Fig. 5 is a view similar to Fig. 4, showing the sensing device in an at rest position.
Figure 6:
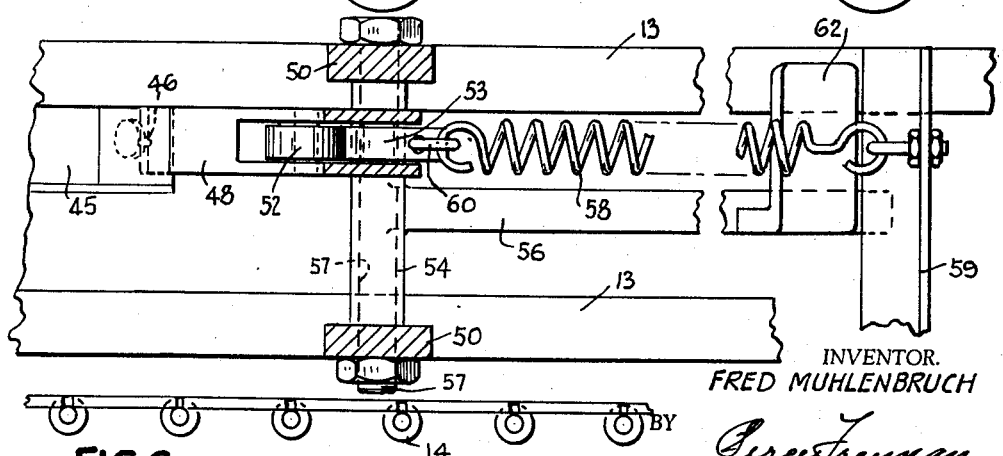
Fig. 6 is a fragmentary transverse cross-sectional view taken along line 6—6 of Fig. 4.

Referring now more in detail to Figs. 4 through 6 of the drawing, a sensing device for use with each one of the individual auxiliary conveyor lines 12 for controlling the position of the gate 25 is shown to include an arm 48 that is pivotally connected at one end by means of a pivot pin 49 to a rigid mounting 50 carried by the conveyor frame. The opposite end of this arm 48 is disposed immediately adjacent to the plunger 46 of the associated pressure relief valve 45. A bearing member 52 that functions as a follower is supported upon a mid section of the arm 48 in engagement with the periphery of a cam member 53 that is secured to a sleeve 54 which carries a control bar 56. This cam is provided with an indent 55 which receives the follower 52 in one adjusted position of the control bar 56. A pivot shaft 57 extends through the sleeve 54 and rotatably supports it upon the rigid mounting 50. A tension spring 58 secured at one end to a rigid bracket 59, is secured at its opposite end to an eye 60 that extends radially outwardly from one side of the cam 53. This spring 58 thus tends to urge the control bar 56 toward a normal at rest position in the path of travel of articles 65 moving along the respective auxiliary conveyor line 12, in the manner illustrated by the position of the uppermost control bar 56 in Fig. 3 of the drawing. A stop member 62 carried by the outside of each control bar 56, limits the inward movement of the control bar under the action of the tension spring 58.

The operation of the present conveyor system will now become apparent. Initially, the control bars 56 of both auxiliary conveyor lines 12 will be in the at-rest position in the path of travel of the articles 65, and the gate 25 will be in blocking engagement with the articles approaching it from one of the conveyor lines while being removed from such blocking engagement with the articles travelling toward it from the other conveyor line. The piston and pressure cylinder 38, as was hereinbefore described, will also be in a balanced state. However, as soon as the first articles 65 engage the control bar 56 in one auxiliary conveyor line, an unbalance is set up within the pressure cylinder 38 that will cause the gate 25 to move toward blocking engagement with the other auxiliary conveyor, thus permitting these first articles to pass directly onto the main conveyor line 11. While these articles continue to flow through this first auxiliary conveyor line, additional articles emanating from the second conveyor line will stack up within the chute of the second auxiliary conveyor line since they cannot flow into the main conveyor line 11 that is blocked by the gate 25. This relationship will continue until there is a momentary lapse in the flow of articles through the first conveyor, at which time, the spring 58 associated with that control bar 56 will effect rotation thereof and the cam 53 toward the at-rest position illustrated in Fig. 5 of the drawing, in which position, the plunger 46 of the relief valve 45 will be depressed, thus setting up an unbalance in the pressure cylinder 38 which will manifest itself by actuating the linkage between the piston 37 and gate 25 and rotate the gate out of blocking engagement with the second auxiliary conveyor line and into blocking engagement with the momentarily empty first conveyor line. This will allow the stacked up articles 65 of the second conveyor line to then flow on to the main conveyor line 11, while additional articles flowing into the first conveyor line will then stack up against the closed gate 25. This relationship will then also continue until there is a momentary lapse of articles in the second conveyor line which will again cause an unbalance in the pressure cylinder 38, so as to effect a change in the position of the gate 25.

It is to be noted that only a movement of the control bar 56 from the adjusted position illustrated in Fig. 4, in which position it is retained by the presence of articles 65 thereagainst, to the position illustrated in Fig. 5 where there are momentarily no articles urging the control bar 56 out of its illustrated at rest position, does the movement of the plunger 46 set up an unbalance in the pressure cylinder 38, since it is only during this change of position that the relief valve is opened to partially exhaust the pressure cylinder. During movement of the control bar 56 in the opposite direction from the at-rest position shown in Fig. 5 to the adjusted position shown in Fig. 4, against the action of the spring 58, the relief valve is merely closed without changing the pressure balance within the cylinder 38.

This system provides means for supplying a single main conveyor line with a substantially continuous flow of articles from two auxiliary conveyor lines that are independently supplied with an intermittent flow of articles, so as to smooth out various types of supply lines.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent, is:

1. A conveyor system comprising, in combination, a continuously operating main conveyor, a pair of intermittently fed continuously operated auxiliary conveyors feeding into said main conveyor, a gate controlling the passage of articles from said auxiliary conveyors into said main conveyor, said gate being movable between alternate blocking relationship with each of said auxiliary conveyors, sensing means associated with each one of said auxiliary conveyors responsive to the presence of articles in each auxiliary conveyor in the vicinity of said gate, and operator means responsive to both of said sensing means for effecting movement of said gate into blocking relationship with one of said auxiliary conveyors from blocking engagement with the other one of said auxiliary conveyors in response to an absence of article adjacent to the sensing means of said one auxiliary conveyor and the presence of articles adjacent to the sensing means of said other auxiliary conveyor, said operator means comprising a double-acting pneumatic cylinder having a piston movable between an extended and a retracted position, each said sensing means comprising an arm pivotally supported in the path of movement of articles adjacent to the terminal of said respective auxiliary conveyor in the vicinity of said gate, and a fluid pressure relief valve supported adjacent to each arm controlling the position of said piston.

2. A conveyor system as set forth in claim 1, further comprising spring means normally urging each said arm into said path of movement of articles and normally maintaining said associated relief valve in an initial closed position, movement of said arm out of said normal position by the presence of articles adjacent thereto adjusting said relief valve to an alternate open position, the position of said pressure relief valve controlling the balance of fluid pressure within said cylinder on both sides of said piston.

3. A conveyor system as set forth in claim 2, wherein said piston is movable from one position to the other only in response to an unbalance within said cylinder resulting from movement of one of said arms into a position different from that occupied by the other one of said arms.

4. A conveyor system as set forth in claim 3, further comprising a crank arm assembly connected between said piston and said gate, said crank arm assembly translating the longitudinal movement of said piston into rotational pivotal movement of said gate.

5. A conveyor system as set forth in claim 4, further comprising stop lugs carried by said arms limiting the extent of movement thereof into said path of travel of said articles.

6. A conveyor system comprising, in combination, a continuously operating main conveyor, a pair of intermittently fed continuously operated auxiliary conveyors feeding into said main conveyor, a gate controlling the passage of articles from said auxiliary conveyors into said main conveyor, said gate being movable between alternate blocking relationship with each of said auxiliary conveyors, sensing means assocated with each one of said auxiliary conveyors responsive to the presence of articles in each auxiliary conveyor in the vicinity of said gate, and operator means responsive to both of said sensing means for effecting movement of said gate into blocking relationship with one of said auxiliary conveyors from blocking engagement with the other one of said auxiliary conveyors in response to an absence of article adjacent to the sensing means of said one auxiliary conveyor and the presence of articles adjacent to the sensing means of said other auxiliary conveyor, said operator means comprising a power means, a reciprocating rod movable by said power means between an extended and a retracted position, each said sensing means comprising an arm pivotally supported in the path of movement of articles adjacent to the terminal of said respective auxiliary conveyor in the vicinity of said gate, and power controlling means operatively associated with said power means, said power controlling means being supported adjacent to and adapted to be actuated by each said arm to control the position of said reciprocating rod.

References Cited in the file of this patent

UNITED STATES PATENTS

| | | |
|---|---|---|
| 1,852,034 | Twomley | Apr. 5, 1932 |
| 1,853,787 | Twomley | Apr. 12, 1932 |
| 2,371,419 | Bergmann | Mar. 13, 1945 |
| 2,678,124 | Bergmann | May 11, 1954 |